(12) United States Patent
Chen et al.

(10) Patent No.: US 9,231,406 B2
(45) Date of Patent: Jan. 5, 2016

(54) MID-VOLTAGE VARIABLE-FREQUENCY DRIVING SYSTEM AND TOTAL HARMONIC DISTORTION COMPENSATION CONTROL METHOD

(75) Inventors: Wei Chen, Shanghai (CN); Bo-Yu Pu, Shanghai (CN); Yi Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 939 days.

(21) Appl. No.: 13/430,722

(22) Filed: Mar. 27, 2012

(65) Prior Publication Data

US 2013/0076293 A1    Mar. 28, 2013

(30) Foreign Application Priority Data

Sep. 23, 2011  (CN) .......................... 2011 1 0286981
Nov. 7, 2011   (CN) .......................... 2011 1 0348824

(51) Int. Cl.
*H02P 1/24* (2006.01)
*H02J 3/01* (2006.01)
*H02P 27/08* (2006.01)
*H02J 3/18* (2006.01)

(52) U.S. Cl.
CPC ... *H02J 3/01* (2013.01); *H02J 3/18* (2013.01); *H02P 27/08* (2013.01); *Y02E 40/30* (2013.01); *Y02E 40/40* (2013.01)

(58) Field of Classification Search
CPC ......... H02K 3/28; H02K 19/22; H02K 19/12; H02K 1/12; H02K 29/03
See application file for complete search history.

(56) References Cited

U.S. PATENT DOCUMENTS

| 7,855,526 B2* | 12/2010 | Ohnishi | H02M 5/4585 318/700 |
| 2007/0040524 A1* | 2/2007 | Sarlioglu | H02P 21/0039 318/438 |
| 2007/0085508 A1* | 4/2007 | Fujitsuna | H02P 6/185 318/712 |
| 2009/0179608 A1* | 7/2009 | Welchko | H02M 7/53875 318/801 |

* cited by examiner

*Primary Examiner* — Shawki S Ismail
*Assistant Examiner* — Zoheb Imitiaz
(74) *Attorney, Agent, or Firm* — CKC & Partners Co., Ltd.

(57) ABSTRACT

A mid-voltage variable-frequency driving system and a total harmonic distortion compensation control method are provided in this invention. The mid-voltage variable-frequency driving system includes a total harmonic distortion compensation unit. The total harmonic distortion compensation unit is used to perform an optimal adjustment on a reactive component reference value of a grid-side phase current, such that a harmonic component of the grid-side phase current may be reduced and a power factor of a three-phase switch-mode rectifier module within the mid-voltage variable-frequency driving system may be maintained.

34 Claims, 12 Drawing Sheets

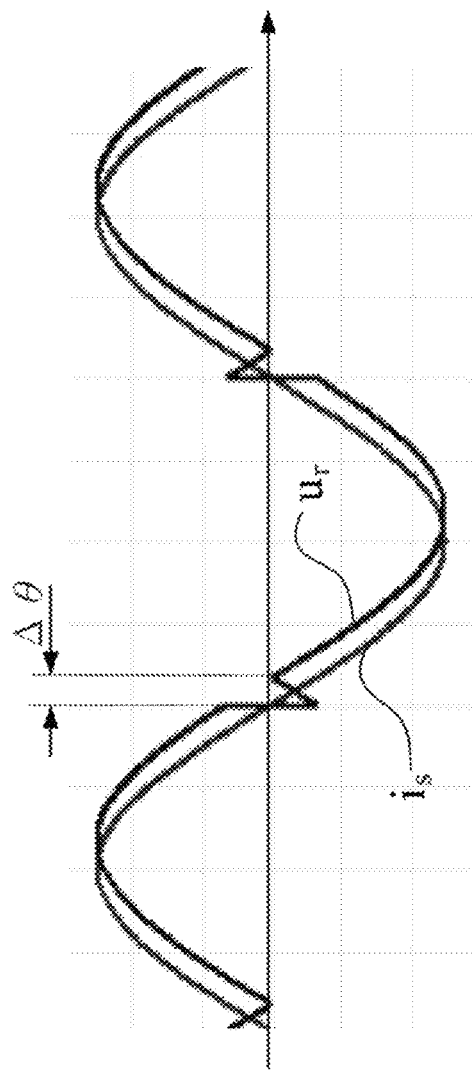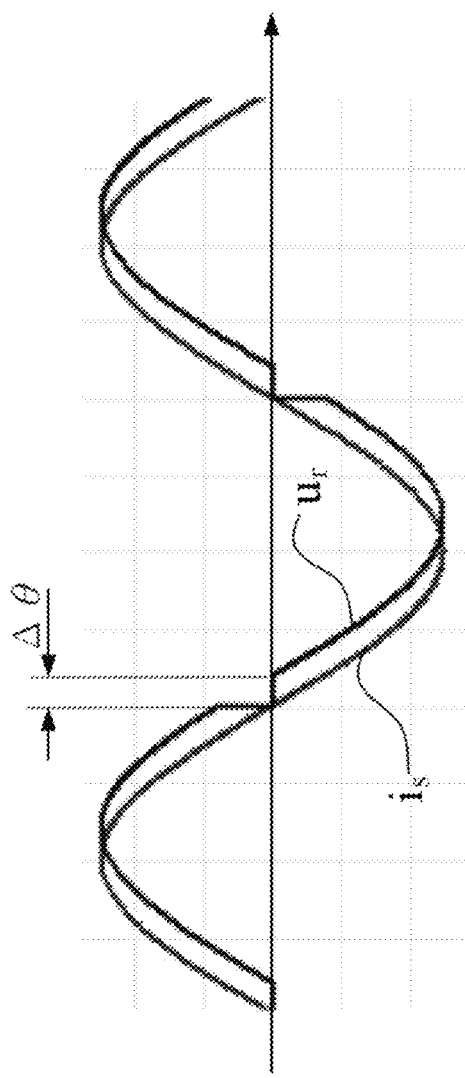

MID-VOLTAGE VARIABLE-FREQUENCY DRIVING SYSTEM AND TOTAL HARMONIC DISTORTION COMPENSATION CONTROL METHOD

RELATED APPLICATIONS

This application claims priorities to Chinese Application Serial Number 201110286981.7, filed Sep. 23, 2011, and Chinese Application Serial Number 201110348824.4, filed Nov. 7, 2011 which are herein incorporated by references.

BACKGROUND

1. Field of Invention

This invention relates to a rectifier module. More particularly, this invention relates to a distortion compensation control method available for a three-phase switch-mode rectifier module with a current mono-direction.

2. Description of Related Art

In the controlling of an electric-driven machine or an induction motor, it is an important issue to adjust a motor speed. A conventional electric-driven machine adopts a DC speed regulating technique, and the applications thereof are limited applications due to big volume and high failure rate of hardware.

A variable-frequency drive (VFD) is an electric driving element using the variable-frequency technology and the microelectronic technology to control an electric power transmission element of an AC motor by changing the frequency and amplitude of a motor operation power source.

The VFD is used for changing the AC power supply frequency and the amplitude of the induction motor, so as to change it's a period of motional magnetic field of the induction motor, thereby achieving the purpose of controlling the rotational speed of the induction motor smoothly. The emergence of VFD simplifies the complicated speed-regulating control. The combination of the VFD and the AC induction motor replaces a DC motor to complete most tasks that originally can only be done by using a DC motor, so that the volume of a circuit system can be decreased and the maintenance ratio can be reduced.

Currently, the mid-voltage variable-frequency speed-regulating system is applied widely and has broad prospects in the aspects of such as a large-scale wind generator, a pump, drafting and gearing. The mid-voltage variable-frequency speed-regulating system needs to have the main functions of a safe and fast frequency control within a wide range; a good grid-side power factor; and good input and output current harmonic waves, etc.

Meanwhile, due to the high requirements on the withstand voltage of a switch element in a mid-voltage (referring to a voltage between 1 kV-35 kV, such as 6 kV in a common application) system, the current most-common mid-voltage variable-frequency speed-regulating system mostly use a multilevel cascade scheme. The multistage transformer can transform a high input voltage of the three-phase electrical grid (at the primary side) into a low operation voltage at the secondary side. Each winding at the secondary side is coupled to a single power unit. Each power unit completes the change from rectifier to inversion for a low operation voltage, so as to implement a variable-frequency speed-regulating function. Through the arrangement of the aforementioned multistage transformer, the issue that the power unit cannot withstand high voltage is solved, and the issue about current harmonic waves at the primary side is also solved.

However, the multistage transformer arranged in the aforementioned conventional mid-voltage variable-frequency speed-regulating system is of large volume and high weight, thus leading to high cost and complex design. Thus, it is an important research issue regarding how to use other speed-regulating system structures to omit the arrangement of the transformer while the same performance is achieved.

Currently, the industry has provided a three-phase switch-mode rectifier module. In a practical circuit application, the three-phase switch-mode rectifier module can be a Vienna rectifier module, which is a multilevel rectifier device. Compared with a general three-level pulse-width modulation (PWM) rectifier, the three-phase switch-mode rectifier module also has features of a simple structure, few switch elements, no risk of bridge arm direct pass and high reliability in addition to a good power factor calibration function and DC voltage control capability which are also owned by the general three-level pulse-width modulation (PWM) rectifier. The three-phase switch-mode rectifier module is very suitable for use in a condition requiring small volume, low cost and no energy feedback.

However, it is still an issue desired to be solved that a conventional three-phase switch-mode rectifier module has dead zones. Referring to FIG. 11 and FIG. 12, FIG. 11 illustrates a schematic simplified view of the three-phase switch-mode rectifier module coupled to the three-phase electrical grid. The conventional three-phase switch-mode rectifier module has a grid-side phase voltage $u_s$ and a rectifier AC-side phase voltage $u_r$. A reactor $L_s$ is connected between the two phase voltages ($u_s$ and $u_r$). Due to the voltage drop impact on the reactor $L_s$ by the phase current, when the grid-side phase current is and the grid-side phase voltage $u_s$ have the same phase, the phase relationship is as shown in FIG. 12, and the grid-side phase current definitely lead the rectifier AC-side phase voltage $u_r$ by a certain phase angle difference $\Delta\theta$. Within the range of the phase angle difference $\Delta\theta$, the rectifier AC-side phase voltage $u_r$ cannot be totally controlled by the controller, but mainly depends on the direction of the phase current until the direction of the outputted AC-side phase voltage controlled by the controller is switched to be the same as that of the phase current.

Thus, the zone of the phase angle difference can be considered as the dead zone of the rectifier, and a distortion will happen to the rectifier AC-side phase voltage in this zone, wherein such a distortion will cause the AC-side phase voltage of the conventional three-phase switch-mode rectifier module to have a very large low-order harmonic, thereby affecting the harmonic of the grid-side phase current. Especially for a mid-high voltage or high-power condition, with the influence of component features, the switching frequency is relatively low, and the harmonic influence brought by this dead zone is more serious, thus resulting in the rise of the total harmonic distortion.

SUMMARY

Thus, in order to resolve the issue of dead zones described above and maintain a good power factor of the rectifier module, this invention discloses the following solutions. This invention discloses a mid-voltage variable-frequency driving system and a three-phase switch-mode rectifier module thereof. Furthermore, this invention further discloses a total harmonic distortion compensation control method for the aforementioned three-phase switch-mode rectifier module.

Compared with a conventional three-level pulse-width modulation (PWM) rectifier, in the circuit structure of the three-phase switch-mode rectifier module provided in the embodiments of this invention, the switch elements may be reduced by half and replaced by power diodes.

Moreover, a dead zone with a certain phase angle difference (Δθ) may exist between the rectifier AC-side phase current flowing through the three-phase switch-mode rectifier module and a fundamental component of the rectifier AC-side phase voltage. At this time, in the three-phase switch-mode rectifier module, a large distortion may happen to the waveform of the rectifier AC-side phase voltage, which may cause the rectifier AC-side phase voltage of the three-phase switch-mode rectifier module to have a large low-order harmonic. The total harmonic distortion compensation control method provided by this invention provides corresponding solutions mainly for the influence of the three-phase switch-mode rectifier module on the low-order harmonic of the electrical grid current in the dead zone.

An aspect of this invention is to provide a total harmonic distortion compensation control method for a three-phase switch-mode rectifier module. The three-phase switch-mode rectifier module is coupled to a three-phase electrical grid for converting an AC voltage input on the three-phase electrical grid into a DC voltage. The total harmonic distortion compensation control method includes the following steps: performing harmonic detection on a grid-side phase current flowing into the three-phase switch-mode rectifier module; stopping adjusting a reactive component reference value of the grid-side phase current when a harmonic component of the grid-side phase current does not reach a predetermined harmonic value so as to form a final reactive component reference value, or further determining a phase angle difference between a fundamental component of the rectifier AC-side phase current and a fundamental component of the rectifier AC-side phase voltage of the three-phase switch-mode rectifier module when a harmonic component of the grid-side phase current exceeds the predetermined harmonic value; stopping adjusting the reactive component reference value when the phase angle difference is a predetermined phase angle difference value, or further determining a power factor of the three-phase switch-mode rectifier module when the phase angle difference is not the predetermined phase angle difference value; and stopping adjusting the reactive component reference value when the power factor does not reach a predetermined power factor value, or adjusting the reactive component reference value when the power factor exceeds the predetermined power factor value so as to change the final reactive component reference value.

According to this invention, the total harmonic distortion compensation control method further includes: comparing a reactive component of the grid-side phase current with the final reactive component reference value; and adjusting the three-phase switch-mode rectifier module according to the aforementioned comparison result until the reactive component of the grid-side phase current approaches the final reactive component reference value.

According to an embodiment of this invention, the predetermined harmonic value is a preset value or an online optimized value.

According to another embodiment of this invention, the predetermined phase angle difference value is zero, a preset nonzero value or an online optimized value.

According to still another embodiment of this invention, the total harmonic distortion compensation control method further includes: an online optimizing total harmonic distortion compensation control method, i.e., a method including adjusting the three-phase switch-mode rectifier module with different reactive component reference values in an allowance range of a power factor, and respectively performing harmonic detection under conditions of different reactive component reference values to obtain plural harmonic components and plural corresponding phase angle differences; and selecting an optimal harmonic component value and a corresponding optimal phase angle difference value from the harmonic components and the corresponding phase angle differences.

In this embodiment, the optimal harmonic component value is applied as the predetermined harmonic value for determining whether the harmonic component of the grid-side phase current exceeds the predetermined harmonic value, and the optimal phase angle difference value is applied as the predetermined phase angle difference value for determining whether the phase angle difference between the fundamental component of the rectifier AC-side phase current and the fundamental component of the rectifier AC-side phase voltage is the predetermined phase angle difference value.

In an actual application, the pre-mentioned phase angle difference may adopt the phase angle difference between the two fundamental components of the rectifier AC-side phase current and the rectifier AC-side phase voltage. In another embodiment, the phase angle difference also may be a phase relationship between any other two current or voltage components. in the mid-voltage variable-frequency driving system.

An aspect of this invention is to provide a total harmonic distortion compensation control method for a mid-voltage variable-frequency driving system. The mid-voltage variable-frequency driving system includes a three-phase switch-mode rectifier module, a three-phase electrical grid, a controller and a total harmonic distortion compensation unit. The three-phase switch-mode rectifier module is coupled to the three-phase electrical grid. The controller is coupled to the three-phase switch-mode rectifier module. The total harmonic distortion compensation unit is coupled to the controller. The total harmonic distortion compensation control method includes: inputting an initial reactive component reference value into the total harmonic distortion compensation unit, wherein the total harmonic distortion compensation unit adjusts the initial reactive component reference value to generate a final reactive component reference value; and controlling each single-phase rectifier circuit of the three-phase switch-mode rectifier module through the controller according to the final reactive component reference value generated by the total harmonic distortion compensation unit, thus adjusting a phase angle difference of the three-phase switch-mode rectifier module, thereby adjusting a power factor corresponding to the three-phase electrical grid and eliminating a current total harmonic distortion corresponding to the three-phase electrical grid, wherein the phase angle difference exists between a fundamental component of the rectifier AC-side phase current and a fundamental component of the rectifier AC-side voltage of each single-phase rectifier circuit of the three-phase switch-mode rectifier module.

According to an embodiment of this invention, the three-phase switch-mode rectifier module includes three sets of single-phase rectifier circuits. The three sets of single-phase rectifier circuits coupled in parallel to each other are three-level rectifier circuits each of which receive a single-phase voltage input from the three-phase electrical grid. The three sets of single-phase rectifier circuits are all coupled to a first output terminal, a midpoint and a second output terminal, and the three-phase switch-mode rectifier module is used for adjusting the power factor and eliminating the current total harmonic distortion.

According to another embodiment of this invention, an inductance is is coupled between each voltage input end of the three sets of single-phase rectifier circuits and the three-phase electrical grid, and each set of single-phase rectifier circuits includes at least two diodes. One diode is a commutating diode for ensuring the unidirectivity of the current, and the other diode is a non-commutating diode.

According to still another embodiment of this invention, in the three sets of single-phase rectifier circuits, the commutating diode is operated at a switching frequency, and the commutating diode adopts a fast-recovery diode.

According to yet another embodiment of this invention, the final reactive component reference value is obtained through an off-line calculation when the rectifier AC-side phase current passing through the three-phase switch-mode rectifier module and the rectifier AC-side phase voltage have the same direction, wherein the off-line calculation is performed by calculating the phase relationship between a grid-side phase current flowing into the three-phase switch-mode rectifier module and a grid-side phase voltage.

According to an embodiment of this invention, the final reactive component reference value is obtained by obtaining a set of reactive component reference values through the off-line calculation and then selecting the corresponding value through a lookup table according to the operation voltage or operation load current of the three-phase electrical grid in real time.

According to another embodiment of this invention, the final reactive component reference value generated by the total harmonic distortion compensation unit further controls a switching state of the switch elements in each single-phase rectifier circuit of the three-phase switch-mode rectifier module through the controller, thereby adjusting the power factor corresponding to the three-phase electrical grid and eliminating the current total harmonic distortion corresponding to the three-phase electrical grid.

According to still another embodiment of this invention, the step of adjusting the initial reactive component reference value and generating the final reactive component reference value through the total harmonic distortion compensation unit further includes: performing harmonic detection on a grid-side phase current flowing into the three-phase switch-mode rectifier module; and stopping adjusting a reactive component reference value of the grid-side phase current when a harmonic component of the grid-side phase current does not reach a predetermined harmonic value, so as to form the final reactive component reference value.

According to still yet another embodiment of this invention, the step of adjusting the initial reactive component reference value and generating the final reactive component reference value through the total harmonic distortion compensation unit further includes: further determining the phase angle difference between the fundamental component of the rectifier AC-side phase current and the fundamental component of the rectifier AC-side phase voltage of each single-phase rectifier circuit of the three-phase switch-mode rectifier module when a harmonic component of the grid-side phase current exceeds the predetermined harmonic value; and stopping adjusting the reactive component reference value when the phase angle difference is a predetermined phase angle difference value so as to form the final reactive component reference value.

According to an embodiment of this invention, the total harmonic distortion compensation control method further includes: further determining a power factor of the three-phase switch-mode rectifier module when the phase angle difference is not the predetermined phase angle difference value; and stopping adjusting the reactive component reference value when the power factor is lower than the predetermined power factor so as to form the final reactive component reference value.

According to another embodiment of this invention, the reactive component reference value is adjusted when the power factor is higher than the predetermined power factor value, so as to change the final reactive component reference value.

According to still another embodiment of this invention, the total harmonic distortion compensation control method further includes: comparing a reactive component of the grid-side phase current with the final reactive component reference value; and adjusting the three-phase switch-mode rectifier module according to the comparison result above until the reactive component of the grid-side phase current approaches the final reactive component reference value.

According to still yet another embodiment of this invention, the predetermined harmonic value is a preset value or an online optimized value.

According to an embodiment of this invention, the predetermined phase angle difference value is zero, a preset non-zero value or an online optimized value.

According to another embodiment of this invention, the three-phase switch-mode rectifier module is adjusted with different reactive component reference values in an allowance range of a power factor, and multiple harmonic components and multiple corresponding phase angle differences are obtained by respectively performing harmonic detection under conditions of different reactive component reference values; an optimal harmonic component value and a corresponding optimal phase angle difference value are selected from the multiple harmonic components and multiple corresponding phase angle differences mentioned above.

According to still another embodiment of this invention, the optimal harmonic component value is applied as the predetermined harmonic value, for determining whether the harmonic component of the grid-side phase current exceeds the predetermined harmonic value, and the optimal phase angle difference value is applied as the predetermined phase angle difference value, for determining whether the phase angle difference between the fundamental component of the rectifier AC-side phase current and the fundamental component of the rectifier AC-side phase voltage is the predetermined phase angle difference value.

An aspect of this invention provides a mid-voltage variable-frequency driving system coupled to a three-phase electrical grid, for driving an induction motor. The mid-voltage variable-frequency driving system includes a three-phase switch-mode rectifier module, a controller and a total harmonic distortion compensation unit. The three-phase switch-mode rectifier module is coupled to the three-phase electrical grid, for converting an AC voltage input on the three-phase electrical grid into a DC voltage. The controller is coupled to the three-phase switch-mode rectifier module. The controller compares a sampled reactive component of the grid-side phase current from the three-phase electrical grid with a final reactive component reference value and thus controls the three-phase switch-mode rectifier module according to the comparison result until the reactive component approaches the final reactive component reference value. The total harmonic distortion compensation unit is used for performing an optimal adjustment on the reactive component reference value such that a harmonic component of the grid-side phase current may be reduced while the power factor is maintained.

According to an embodiment of this invention, the total harmonic distortion compensation unit performs harmonic detection on a grid-side phase current flowing into the three-phase switch-mode rectifier module, and stops adjusting a reactive component reference value of the grid-side phase current when a harmonic component of the grid-side phase current does not reach a predetermined harmonic value so as to form the final reactive component reference value, or further determines a phase angle difference between a fundamental component of a rectifier AC-side phase current and a fundamental component of a rectifier AC-side phase voltage of each single-phase rectifier circuit of the three-phase switch-mode rectifier module when a harmonic component of the grid-side phase current exceeds the predetermined harmonic value. The total harmonic distortion compensation unit stops adjusting the reactive component reference value when the phase angle difference is a predetermined phase angle difference value so as to form the final reactive component reference value, or further determines a power factor of the three-phase switch-mode rectifier module when the phase angle difference is not the predetermined phase angle difference value. The total harmonic distortion compensation unit stops adjusting the reactive component reference value when the power factor does not reach a predetermined power factor value so as to form the final reactive component reference value, or adjusts the reactive component reference value when the power factor exceeds the predetermined power factor value so as to change the final reactive component reference value.

According to another embodiment of this invention, the controller compares a reactive component of the grid-side phase current with a final reactive component reference value and adjusts the three-phase switch-mode rectifier module according to the comparison result above until the reactive component of the grid-side phase current approaches the final reactive component reference value.

According to still another embodiment of this invention, a filter unit is coupled to each single-phase input path between the three-phase switch-mode rectifier module and the three-phase electrical grid. Each filter unit includes a first reactance, a second reactance and a capacitor coupled in series.

According to still yet another embodiment of this invention, the total harmonic distortion compensation unit adjusts the three-phase switch-mode rectifier module with different reactive component reference values in an allowance range of a power factor, and performs harmonic detection respectively under conditions of different reactive component reference values to obtain multiple harmonic components and multiple corresponding phase angle differences, and selects an optimal harmonic component value and a corresponding optimal phase angle difference value generated through online optimization.

According to an embodiment of this invention, the optimal harmonic component value generated through online optimization is applied as the predetermined harmonic value, by which the total harmonic distortion compensation unit determines whether the harmonic component of the grid-side phase current exceeds the predetermined harmonic value, and the optimal phase angle difference value is applied as the predetermined phase angle difference value, by which the total harmonic distortion compensation unit determines whether the phase angle difference between the fundamental component of the rectifier AC-side phase current and the fundamental component of the rectifier AC-side phase voltage is the predetermined phase angle difference value.

According to another embodiment of this invention, the three-phase switch-mode rectifier module includes three sets of single-phase rectifier circuits. The three sets of single-phase rectifier circuits coupled in parallel with each other are three-level rectifier circuits each of which receives a single-phase voltage input from the three-phase electrical grid. The three sets of single-phase rectifier circuits are all coupled to a first output terminal, a midpoint and a second output terminal, and the three-phase switch-mode rectifier module is used for adjusting the power factor and eliminating the current total harmonic distortion.

According to still another embodiment of this invention, an inductance is coupled between each voltage input end of the three sets of single-phase rectifier circuits and the three-phase electrical grid, and each set of single-phase rectifier circuits includes at least two diodes. One diode is a commutating diode for ensuring the unidirectivity of the current, and the other diode is a non-commutating diode.

According to still yet another embodiment of this invention, in the three sets of single-phase rectifier circuits, the commutating diode is operated at a switching frequency, and the commutating diode adopts a fast-recovery diode.

According to an embodiment of this invention, the three-phase switch-mode rectifier module is a three-phase Vienna rectifier module.

According to another embodiment of this invention, the mid-voltage variable-frequency driving system further includes an inverter and a high-capacity capacitor module. The inverter is coupled with the three-phase switch-mode rectifier module. The inverter is combined with the three-phase switch-mode rectifier module and converts the DC voltage into an AC voltage used for driving the induction motor. The high-capacity capacitor module is coupled between the three-phase switch-mode rectifier module and the inverter, for temporarily storing the DC voltage.

According to still another embodiment of this invention, the three-phase switch-mode rectifier module includes three sets of single-phase rectifier circuits. Each of the three sets of single-phase rectifier circuits coupled in parallel to each other receives a single-phase voltage input from the three-phase electrical grid. The three sets of single-phase rectifier circuits are all coupled to a first output terminal, a midpoint and a second output terminal.

According to still yet another embodiment of this invention, the high-capacity capacitor module includes a first capacitor and a second capacitor. The first capacitor is coupled between the first output terminal and the midpoint. The second capacitor is coupled between the midpoint and the second output terminal.

In the aforementioned embodiments, each set of the three sets of single-phase rectifier circuits may include a first diode, a second diode, a third diode, a fourth diode, a first switch and a second switch. The anode of the first diode is coupled to the single-phase voltage input. The anode of the second diode is coupled to the cathode of the first diode, and the cathode of the second diode is coupled to the first output terminal. The cathode of the third diode is coupled to the single-phase voltage input. The cathode of the fourth diode is coupled to the anode of the third diode, and the anode of the fourth diode is coupled to the second output terminal. A first terminal of the first switch is coupled between the first diode and the second diode, and a second terminal of the first switch is coupled to the midpoint. A first terminal of the second switch is coupled to the midpoint, and a second terminal of the second switch is coupled between the third diode and the fourth diode.

Another aspect of this invention is to provide a total harmonic distortion compensation control method for a mid-voltage variable-frequency driving system. The mid-voltage variable-frequency driving system includes a three-phase switch-mode rectifier module, a three-phase electrical grid, a controller and a total harmonic distortion compensation unit.

The three-phase switch-mode rectifier module is coupled with the three-phase electrical grid, the controller is coupled with the three-phase switch-mode rectifier module, and the total harmonic distortion compensation unit is coupled with the controller. The total harmonic distortion compensation control method includes: inputting an initial reactive component reference value into the total harmonic distortion compensation unit, wherein the total harmonic distortion compensation unit adjusts the initial reactive component reference value to generate a final reactive component reference value; and controlling the three sets of single-phase rectifier circuits of the three-phase switch-mode rectifier module through the controller according to the reactive component reference value generated by the total harmonic distortion compensation unit, thus adjusting a phase angle difference of the three-phase switch-mode rectifier module, thereby adjusting a power factor corresponding to the three-phase electrical grid and eliminating a current total harmonic distortion corresponding to the three-phase electrical grid. The phase angle difference exists between a fundamental component of the rectifier AC-side phase current and a fundamental component of the rectifier AC-side voltage of each single-phase rectifier circuit of the three-phase switch-mode rectifier module.

Another aspect of this invention is to provide a total harmonic distortion compensation control method for a mid-voltage variable-frequency driving system. The mid-voltage variable-frequency driving system includes a three-phase switch-mode rectifier module, a three-phase electrical grid, a controller and a total harmonic distortion compensation unit. The three-phase switch-mode rectifier module is coupled to the three-phase electrical grid. The controller is coupled with the three-phase switch-mode rectifier module. The total harmonic distortion compensation unit is coupled to the controller. The total harmonic distortion compensation control method includes: inputting an initial reactive component reference value into the total harmonic distortion compensation unit, wherein the total harmonic distortion compensation unit adjusts the initial reactive component reference value to generate a reactive component reference value; and controlling each single-phase rectifier circuit of the three-phase switch-mode rectifier module through the controller according to the reactive component reference value generated by the total harmonic distortion compensation unit, thus adjusting a phase angle difference of the three-phase switch-mode rectifier module, thereby adjusting a power factor corresponding to the three-phase electrical grid and eliminating a current total harmonic distortion corresponding to the three-phase electrical grid. The phase angle difference exists between any two voltage or current components in the mid-voltage variable-frequency driving system.

BRIEF DESCRIPTION OF THE DRAWINGS

In order to make the foregoing as well as other aspects, features, advantages, and embodiments of this invention more apparent, the accompanying drawings are described as follows:

FIG. 7B illustrates a schematic signal timing view when a distortion happens to the outputted equivalent rectifier AC-side phase voltage of the three-phase switch-mode rectifier module after consideration of the dead zone;

FIG. 7C illustrates a schematic signal timing view when another distortion happens to the rectifier AC-side phase voltage of the three-phase switch-mode rectifier module after consideration of the dead zone;

DETAILED DESCRIPTION

Figure 1:
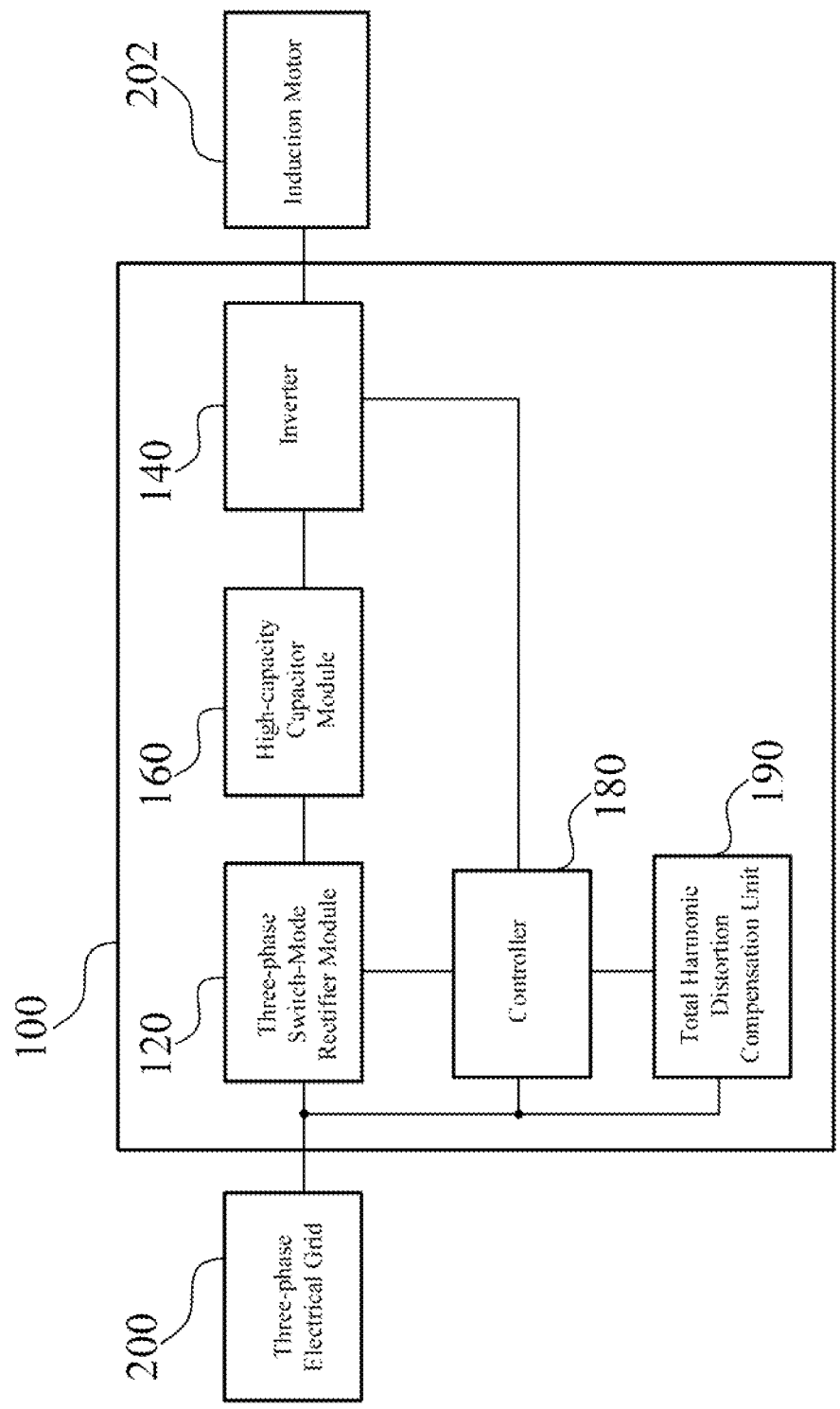
FIG. 1 illustrates a schematic functional block diagram of a mid-voltage variable-frequency driving system according to an embodiment of this invention.

Referring to FIG. 1, FIG. 1 illustrates a schematic functional block diagram of a mid-voltage variable-frequency driving system 100 according to an embodiment of this invention. In practical application, the mid-voltage variable-frequency driving system 100 is coupled to a three-phase electrical grid 200, and can be used for driving an induction motor 202. As shown in FIG. 1, the mid-voltage variable-frequency driving system 100 includes a three-phase switch-mode rectifier module 120, an inverter 140, a high-capacity capacitor module 160, a controller 180 and a total harmonic distortion (THD) compensation unit 190.

The three-phase switch-mode rectifier module 120 is coupled to the three-phase electrical grid 200 for converting an AC voltage input with a fixed operating frequency on the three-phase electrical grid 200 into a DC voltage. The inverter 140 is coupled to the three-phase switch-mode rectifier module 120. The inverter 140 is combined with the three-phase switch-mode rectifier module 120 and converts a DC voltage into an AC voltage used for driving the induction motor. The high-capacity capacitor module 160 is coupled between the three-phase switch-mode rectifier module 120 and the inverter 140 for temporarily storing the DC voltage.

Figure 2:
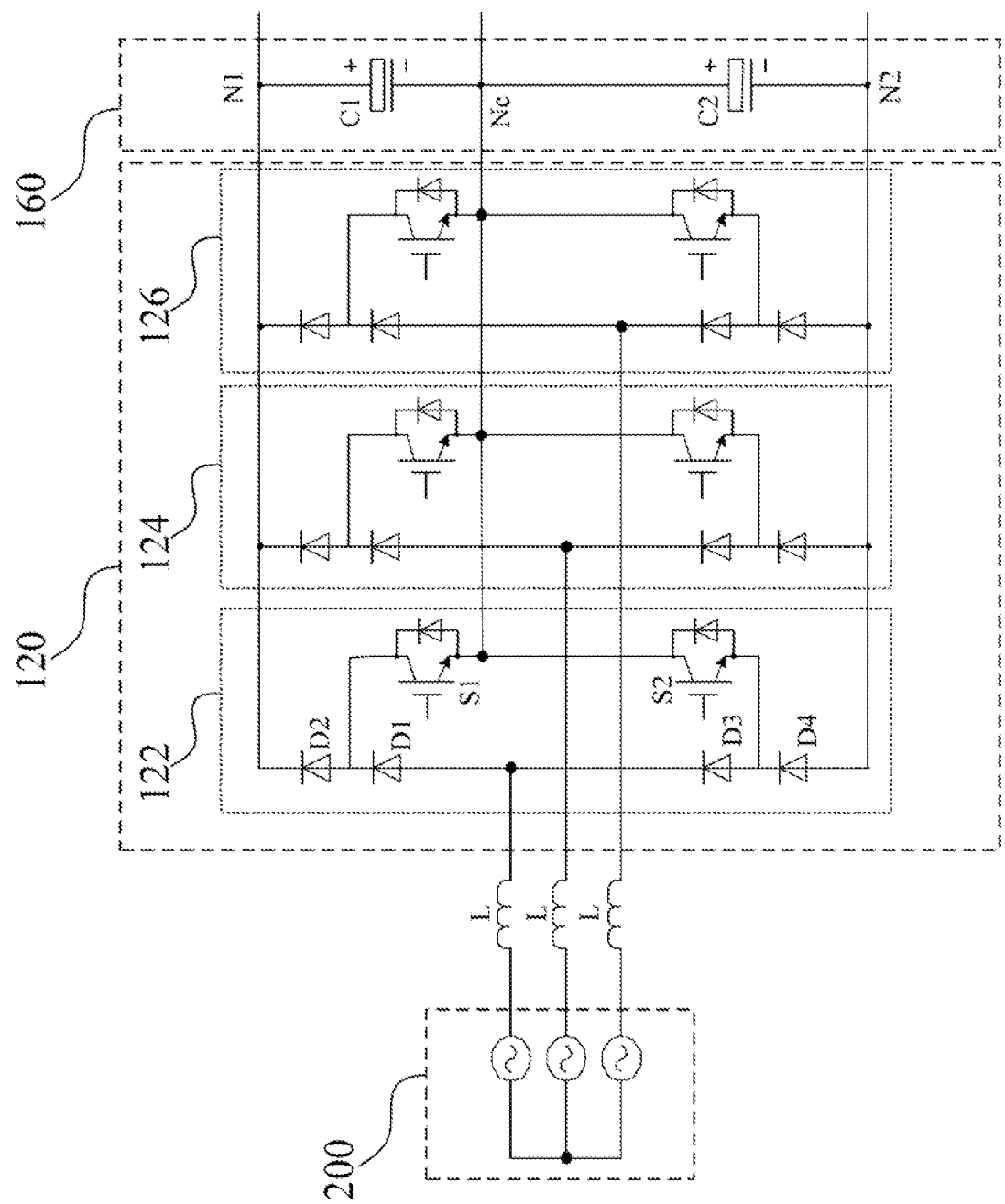
FIG. 2 illustrates a schematic partial view of the three-phase switch-mode rectification module in the mid-voltage variable-frequency driving system and the peripheral circuit.

In this embodiment, the three-phase switch-mode rectifier module 120 itself may use a structure of a three-phase Vienna rectifier module. The internal structure of the three-phase switch-mode rectifier module 120 provided in this invention will be further illustrated in the following paragraphs. Referring to FIG. 2 at the same time, FIG. 2 illustrates a schematic partial view of the three-phase switch-mode rectifier module 120 in the mid-voltage variable-frequency driving system 100 and the peripheral circuits. In practice, the regulation manner of this invention may be applied in various current mono-direction three-phase switch-mode rectifier modules, and is not limited to this circuit structure.

As shown in FIG. 2, the three-phase switch-mode rectifier module 120 includes three sets of single-phase rectifier circuits (a single-phase rectifier circuit 122, a single-phase rectifier circuit 124 and a single-phase rectifier circuit 126). Each of the three sets of single-phase rectifier circuits 122-126 coupled in parallel to each other receives a set of single-phase voltage input from the three-phase electrical grid 200, and the three sets of single-phase rectifier circuits 122-126 are all coupled to a first output terminal N1, a midpoint Nc and a second output terminal N2 (as shown in FIG. 2).

Furthermore, in this embodiment, the high-capacity capacitor module 160 may include a first capacitor C1 and a second capacitor C2. The first capacitor C1 is coupled between the first output terminal N1 and the midpoint Nc. The second capacitor C2 is coupled between the midpoint Nc and the second output terminal N2.

Since the three sets of single-phase rectifier circuits 122-126 in the three-phase switch-mode rectifier module 120 all have similar structures, for a purpose of simple illustration, the single-phase rectifier circuit 122 is taken as an example for explanation. The other single-phase rectifier circuits 124 and 126 have corresponding structures, and thus are not described again herein.

As shown in FIG. 2, according to an embodiment of this invention, the single-phase rectifier circuit 122 includes a first diode D1, a second diode D2, a third diode D3, a fourth diode D4, a first switch S1 and a second switch S2. The anode of the first diode D1 is coupled to the single-phase voltage input. The anode of the second diode D2 is coupled to the cathode of the first diode D1, and the cathode of the second diode D2 is coupled to the first output terminal N1. The cathode of the third diode D3 is coupled to the single-phase voltage input. The cathode of the fourth diode D4 is coupled to the anode of the third diode D3, and the anode of the fourth diode D4 is coupled to the second output terminal N2. One terminal of the first switch S1 is coupled between the first diode D1 and the second diode D2, and the other terminal of the first switch S1 is coupled to the midpoint Nc. One terminal of the second switch S2 is coupled to the midpoint Nc, and the other terminal of the second switch S2 is coupled between the third diode D3 and the fourth diode D4.

In order to understand the operation manner of the three-phase switch-mode rectifier module 120 (the single-phase rectifier circuit 122, the single-phase rectifier circuit 124 and the single-phase rectifier circuit 126) provided by this invention, an equivalent single-phase circuit of the single-phase rectifier circuit 122 is used for illustration in the following paragraphs. Referring to FIG. 3 to FIG. 6 at the same time, FIG. 3 to FIG. 6 respectively illustrate schematic equivalent single-phase circuit views of the single-phase rectifier circuit 122 under different operation modes.

Figure 3:
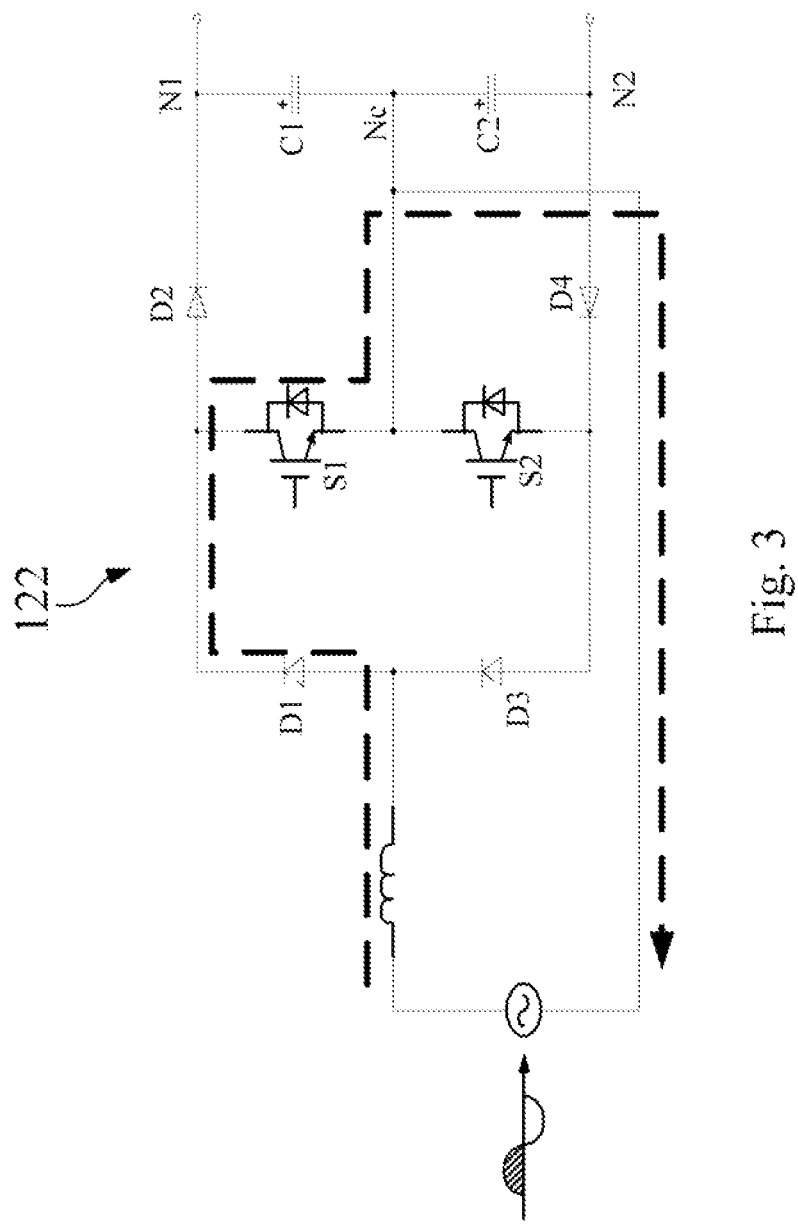
FIG. 3 illustrates a schematic equivalent single-phase circuit view of the single-phase rectifier circuit under an operation mode.
Figure 4:
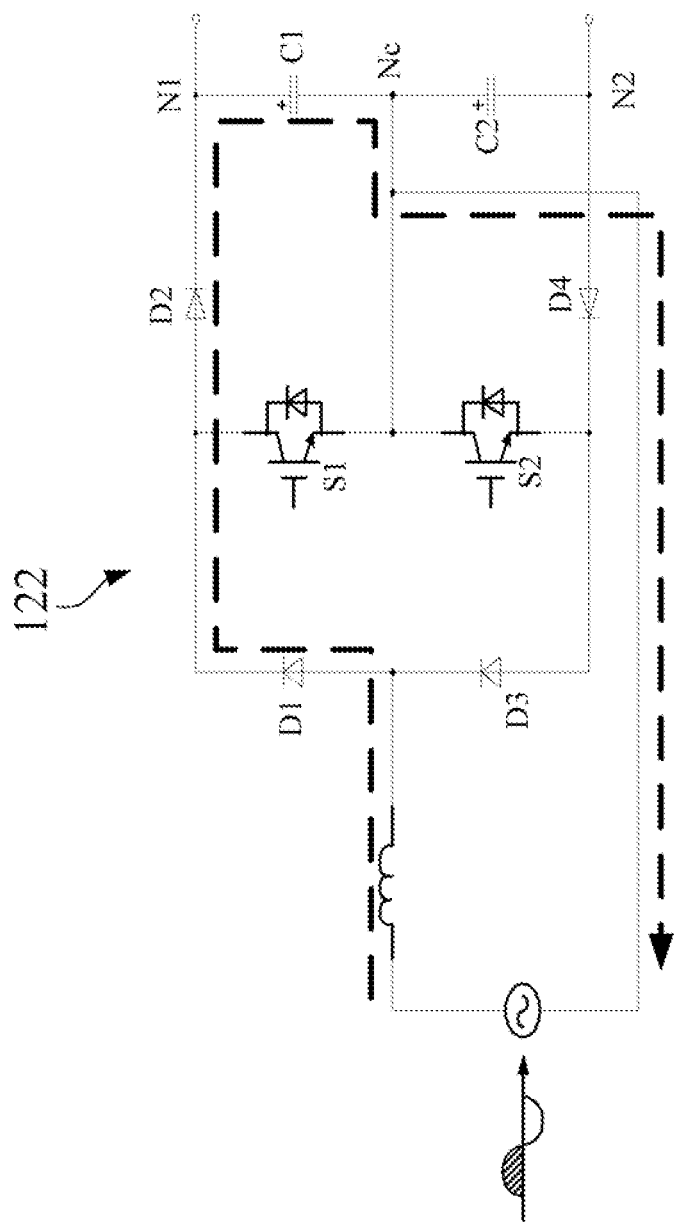
FIG. 4 illustrates a schematic equivalent single-phase circuit view of the single-phase rectifier circuit under another operation mode.
Figure 5:
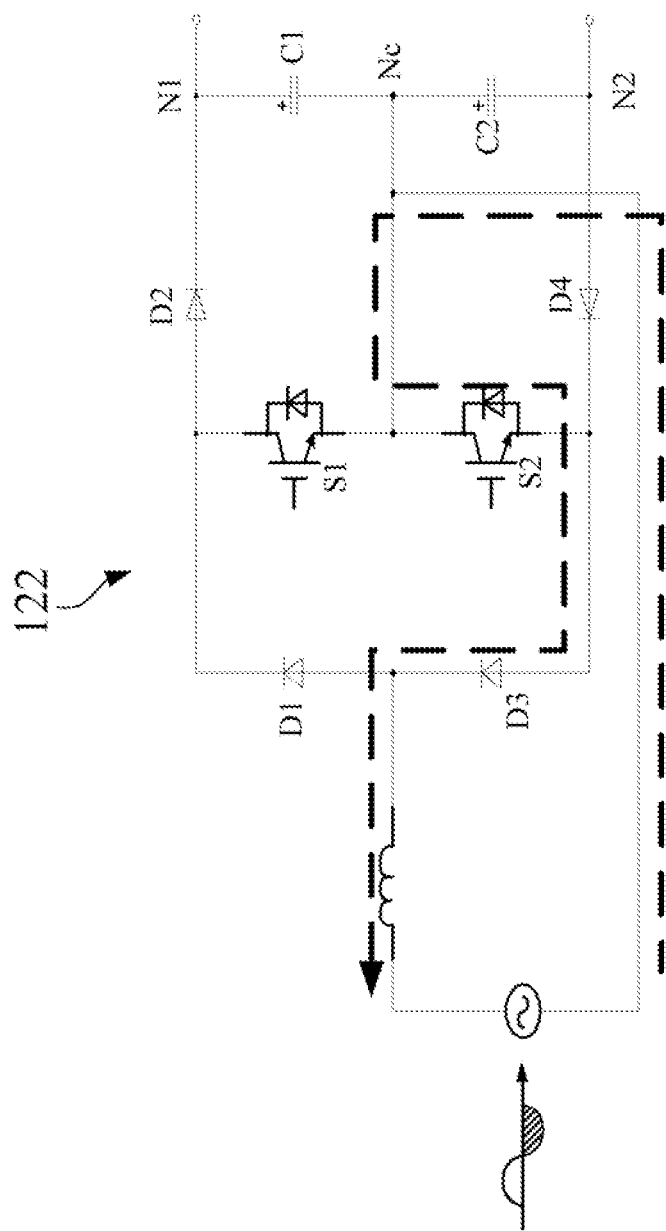
FIG. 5 illustrates a schematic equivalent single-phase circuit view of the single-phase rectifier circuit under still another operation mode.
Figure 6:
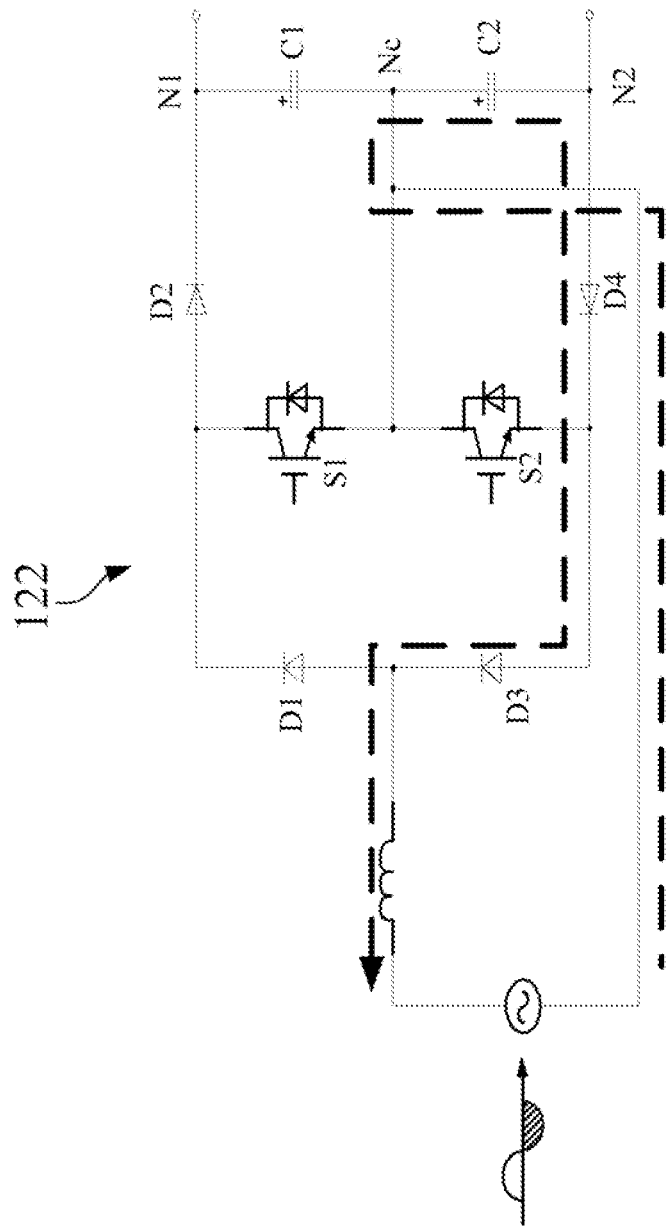
FIG. 6 illustrates a schematic equivalent single-phase circuit view of the single-phase rectifier circuit under still yet another operation mode.

FIG. 3 illustrates a current flow-direction path of the single-phase rectifier circuit 122 when the single-phase voltage input is in a positive phase and the first switch S1 is turned on. FIG. 4 illustrates a current flow-direction path of the single-phase rectifier circuit 122 when the single-phase voltage input is in a positive phase and the first switch S1 is turned off. FIG. 5 illustrates a current flow-direction path of the single-phase rectifier circuit 122 when the single-phase voltage input is in a negative phase and the second switch S2 is turned on. FIG. 6 illustrates a current flow-direction path of the single-phase rectifier circuit 122 when the single-phase voltage input is in a negative phase and the second switch S2 is turned off.

Compared with a conventional three-level pulse-width modulation (PWM) rectifier, in the internal circuit structure, i.e. the three sets of single-phase rectifier circuits 122-126, of the three-phase switch-mode rectifier module 120 provided in this invention, the switch elements may be reduced by half and replaced with diodes.

Figure 7A:
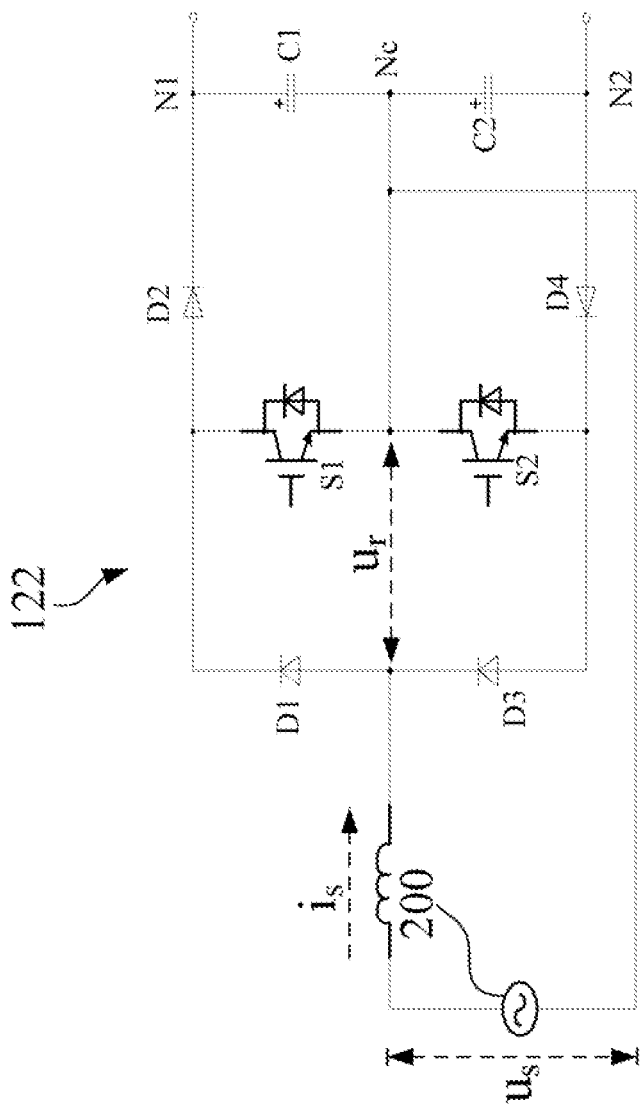
FIG. 7A illustrates a schematic equivalent single-phase circuit view of the single-phase rectifier circuit.

Referring to FIG. 7A at the same time, FIG. 7A illustrates a schematic equivalent single-phase circuit view of the single-phase rectifier circuit 122. As shown in FIG. 7A, a reactor $L_s$ is connected between the fundamental component $u_s$ of the grid-side phase voltage of the three-phase electrical grid 200 and the fundamental component $u_r$ of the rectifier AC-side voltage. In an actual application, the reactor $L_s$ may have the functions of energy storage and boost, voltage source connection and filtering simultaneously.

Since the fundamental component of the grid-side phase current inputted into the single-phase rectifier circuit 122 of the three-phase switch-mode rectifier module 120 may affected by the voltage drop on the reactor $L_s$, when the fundamental component of the grid-side phase current and the fundamental component $u_s$ of the grid-side phase voltage have the same phase, and the fundamental component of the grid-side phase current necessarily leads the fundamental component $u_r$ of the rectifier AC-side phase voltage by a certain phase angle difference ($\Delta\theta$). Within the range of the phase angle difference ($\Delta\theta$), rather than being totally controlled by the controller (such as the controller 180 in FIG. 1), the fundamental component $u_r$ of the rectifier AC-side phase voltage of the single-phase rectifier circuit 122 of the three-phase switch-mode rectifier module 120 also depends on the direction of the phase current at the same time, until the direction of the outputted phase voltage modulation wave controlled by the controller is switched to be the same as that of the phase current. Thus, the $\Delta\theta$ phase difference zone may be regarded as the dead zone of the three-phase switch-mode rectifier module 120. A distortion happens to the rectifier voltage in this zone, as shown in FIG. 7B. FIG. 7B illustrates a schematic signal timing view when a distortion happens to the rectifier AC-side phase voltage $u_r$ of the three-phase switch-mode rectifier module 120 after consideration of the dead zone. The distortion shown in FIG. 7B happens when two switch elements are simultaneously turned on or off. Furthermore, FIG. 7C illustrates a schematic signal timing view when another distortion happens to the rectifier AC-side phase voltage $u_r$ of the three-phase switch-mode rectifier module 120 after consideration of the dead zone. The distortion in FIG. 7C happens when two switch elements are respectively controlled.

This distortion causes the rectifier AC-side phase voltage $u_r$ of the switch-mode rectifier to have very large low-order harmonic. The harmonic of the grid-side phase current may be jointly determined by the grid-side phase voltage and the rectifier AC-side phase voltage. Thus, the increase of the low-order harmonic of the rectifier AC-side phase voltage may finally lead to the corresponding increase of the low-order harmonic of the grid-side phase current. Especially for a mid-high voltage or high-power condition, with the influence of the component features, the switching frequency may be low, and the harmonic influence caused by this dead zone may be more serious. The total harmonic distortion compensation control method provided by this invention may provide corresponding solutions mainly for the influence on the low-order harmonic of the electrical grid current in the dead zone by the three-phase switch-mode rectifier module.

The dead zone is the main cause for the generation of the low-order harmonic. The unidirectivity of the current of the three-phase switch-mode rectifier module and the phase difference between the fundamental component of the rectifier AC-side phase current and the fundamental component of the rectifier AC-side phase voltage of the three-phase switch-mode rectifier module may jointly determine the generation of the dead zone. The unidirectivity of the current of the three-phase switch-mode rectifier module may be determined by the circuit structure and cannot be changed fundamentally. As provided in this invention, the phase difference of the current and voltage may be compensated through certain means, so as to minimize the phase angle difference ($\Delta\theta$) and the dead zone, thereby significantly reducing the low-order harmonic, thus meliorating the harmonic distortion of the three-phase switch-mode rectifier module 120.

In addition to the harmonic distortion mentioned above, among the factors affecting the performance of the three-phase switch-mode rectifier module 120, the power factor of the three-phase switch-mode rectifier module 120 is also very important. In an ideal condition, the three-phase switch-mode rectifier module 120 may have an ideal power factor value of 1. Hereinafter, how the three-phase switch-mode rectifier module 120 of this invention can have an ideal total harmonic distortion while the power factor is maintained is described.

Figure 8:
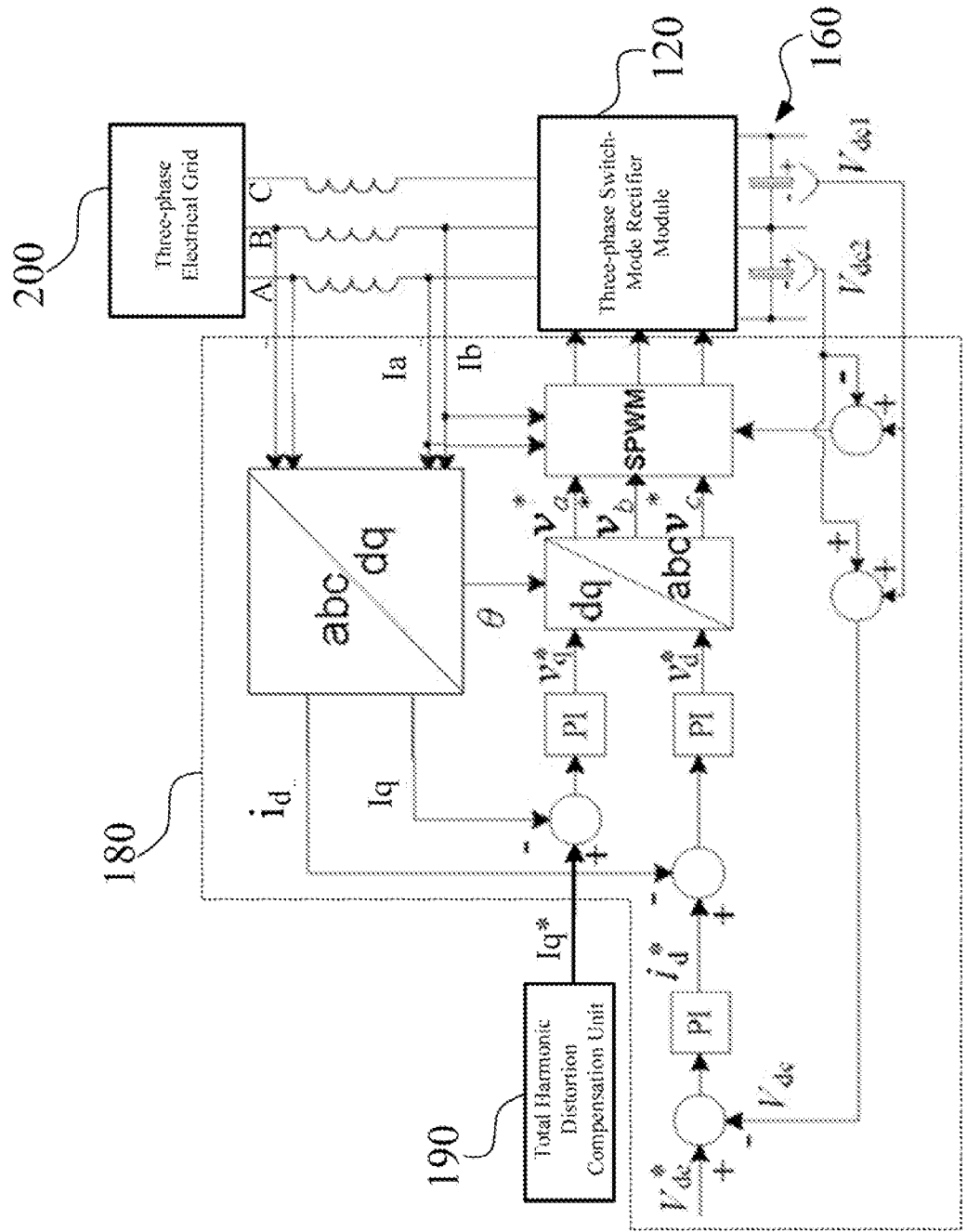
FIG. 8 illustrates a schematic view of a controller and a total harmonic distortion compensation unit included in a mid-voltage variable-frequency driving system according to an embodiment of this invention.

Referring to FIG. 8 at the same time, FIG. 8 illustrates a schematic view of a controller 140 and a total harmonic distortion compensation unit 190 included in a mid-voltage variable-frequency driving system 100 according to an embodiment of this invention. As shown in FIG. 8, the controller 180 can compare the sampled reactive component Iq of the fundamental component of the grid-side phase current from the three-phase electrical grid 200 with the final reactive component reference value. In this invention, the final reactive component reference value may be an adjusted reactive component reference value Iq*. The calculation and adjustment of the reactive component reference value Iq* for generating the final reactive component reference value are described in the following paragraphs.

The controller 180 is coupled to the three-phase switch-mode rectifier module 120. The controller 180 controls the three-phase switch-mode rectifier module 120 in a feedback manner according to the comparison result until the reactive component Iq approaches the final reactive component reference value. In a general method, the final reactive component reference value is preset to 0, such that the power factor of the three-phase switch-mode rectifier module 120 is 1, which is the optimal power factor state. However, when the reached power factor is 1, the phase angle difference ($\Delta\theta$) and harmonic distortion described above are necessarily formed.

Thus, the total harmonic distortion compensation unit 190 provided by this invention may be used for performing an optimal adjustment on the reactive component reference value Iq* so as to generate a final reactive component reference value. The reactive component reference value Iq* is applied as the optimized final reactive component reference value by adjusting the reactive component reference value Iq* to be a preset nonzero preferred value or an online optimized value. As such, the harmonic component of the grid-side phase current may be reduced and the control capability of the power factor of the three-phase switch-mode rectifier module 120 may be maintained.

The process regarding performing an optimal adjustment on the reactive component reference value Iq* adopted by the total harmonic distortion compensation unit 190 for generating the optimal final reactive component reference value may adopt a total harmonic distortion compensation control method, and total harmonic distortion compensation control method is explained as follows.

The total harmonic distortion compensation control method of this embodiment includes an off-line regulation manner, an online regulation manner, and an online optimizing manner etc., thereby obtaining the optimal value of the reactive component reference value Iq*, i.e., the final reactive component reference value.

The entire control process of the off-line regulation manner may include: obtaining a set of reactive component reference values Iq* by calculating the phase relationship between the fundamental component of the grid-side phase current and the fundamental component of the grid-side phase voltage $u_s$ when the fundamental component of the rectifier AC-side phase current $i_r$ and the fundamental component of rectifier AC-side phase voltage $u_r$ have the same direction; and obtaining corresponding values through a lookup table in real time according to operation conditions such as the operation voltage and the operation load current on the three-phase electrical grid The off-line calculation method of the reactive component reference value Iq* mainly depends on the phase relationship between the fundamental component of the phase voltage and the fundamental component of the phase current, as expressed in equations (1)-(5).

$$\angle \dot{I}_r = \angle \dot{I}_s \quad (1)$$

$$\dot{U}_s = j\omega L_s \dot{I}_s + \dot{U}_r \quad (2)$$

$$\angle \dot{U}_r = \angle \dot{I}_r \quad (3)$$

$$\delta = \angle \dot{U}_s - \angle \dot{I}_s \quad (4)$$

$$I_q^* = -\sqrt{2}|\dot{I}_s|\sin\delta \quad (5)$$

Since the implementation manner of the off-line calculation method is simple, a set of reactive component reference values Iq* may be off-line calculated under different operation conditions and used as the final reactive component reference value of this invention, for being applied in different operation conditions.

The calculation described above is based on a single-inductance filter system. A filter unit with a reactance-capacitance-reactance (LCL) architecture may be introduced between the three-phase switch-mode rectifier module 120 and the three-phase electrical grid 200. Three filter units are respectively coupled to each single-phase input path between the rectifier module 120 and the three-phase electrical grid 200, and each filter unit includes a first reactance $L_s$, a second reactance $L_r$, and a capacitor Cr, thereby forming the reactance-capacitance-reactance (LCL) filter architecture. The calculation relationship is shown as follows, as expressed in equations (6)-(12):

$$\dot{U}_s = j\omega L_s \dot{I}_s + \dot{U}_{Cr} \quad (6)$$

$$\dot{U}_{Cr} = j\omega L_r \dot{I}_r + \dot{U}_r \quad (7)$$

$$\dot{U}_{Cr} = \frac{\dot{I}_{Cr}}{j\omega C_r} \quad (8)$$

$$\dot{I}_s = \dot{I}_{Cr} + \dot{I}_r \quad (9)$$

$$\angle \dot{U}_r = \angle \dot{I}_r \quad (10)$$

$$\delta = \angle \dot{U}_s - \angle \dot{I}_s \quad (11)$$

$$I_q^* = -\sqrt{2}|\dot{I}_s|\sin\delta \quad (12)$$

Wherein the reactive component reference value Iq* is expressed as equation (12). With the premise of determined system parameters, no matter what the filter structure is, an appropriate reactive component may be obtained through calculation, thereby adjusting the phase difference between the fundamental component of the rectifier AC-side phase voltage and the fundamental component of the rectifier AC-side phase current to be optimal. As such, the final reactive component reference value of this invention may be obtained through the off-line calculation manner when the fundamental component of the rectifier AC-side phase current $i_r$ and the fundamental component of the rectifier AC-side phase voltage $u_r$ have the same direction. However, this invention is not limited to the off-line calculation.

Figure 9:
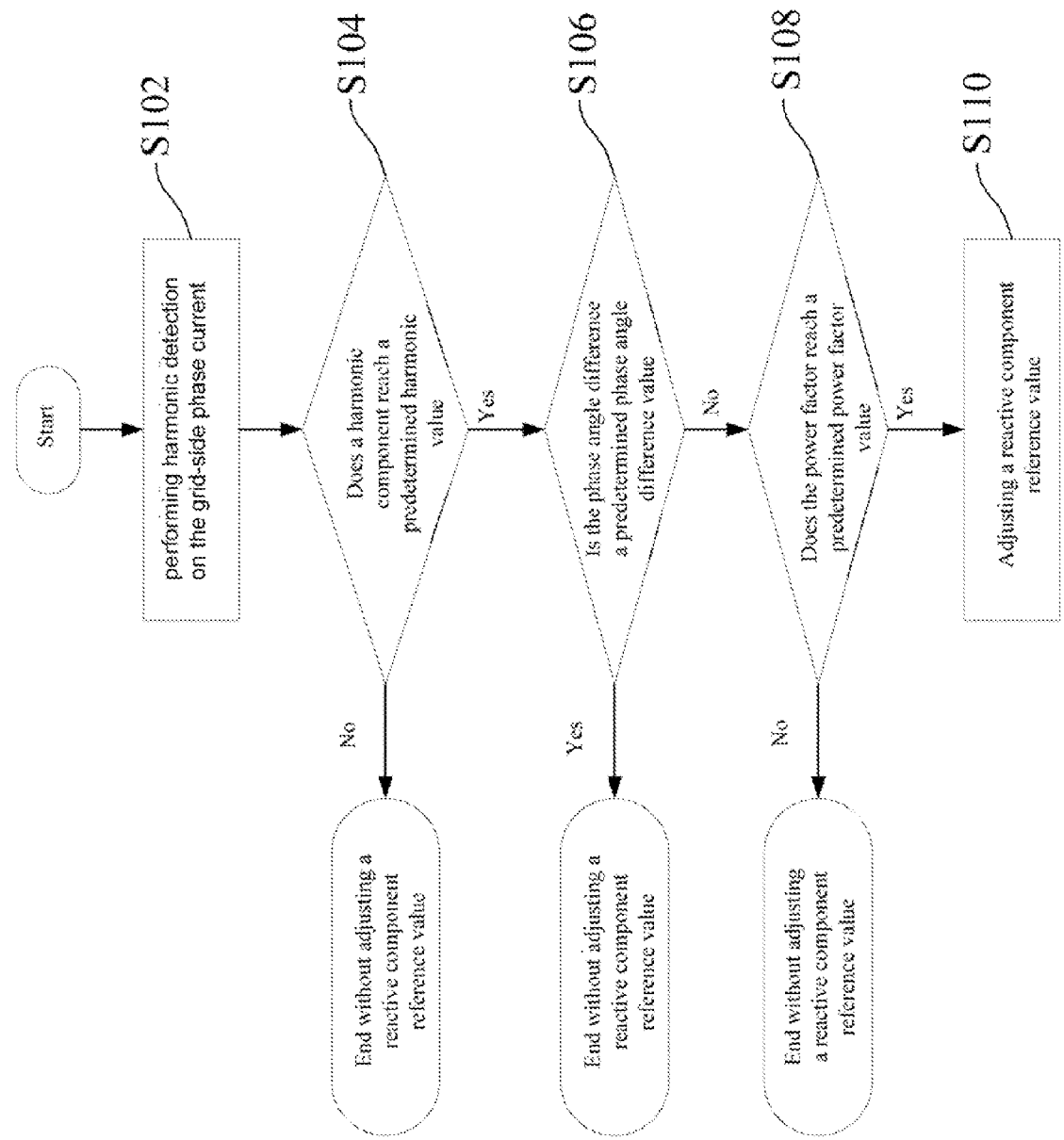
FIG. 9 illustrates a flowchart showing a total harmonic distortion compensation control method adopting an online regulation manner according to an embodiment of this invention.

In another aspect, the entire control process of online regulation is shown as follows. Referring to FIG. 8 and FIG. 9 at the same time, FIG. 9 illustrates a method flowchart showing a total harmonic distortion compensation control method adopting an online regulation manner according to an embodiment of this invention.

As shown in FIG. 8 and FIG. 9, in the total harmonic distortion compensation control method of this invention, step S102 is first performed for performing harmonic detection on the grid-side phase current flowing into the three-phase switch-mode rectifier module 120. Then, step S104 is performed for determining whether the harmonic component of the grid-side phase current reaches the predetermined harmonic value. Adjustment of the reactive component reference value Iq* of the fundamental component of the grid-side phase current is stopped when the harmonic component of the grid-side phase current does not reach the predetermined harmonic value, and the reactive component reference value Iq* of that time is applied as the final reactive component reference value. In this embodiment, the predetermined harmonic value may be a preset value. In another embodiment, the predetermined harmonic value may further be an optimal value obtained through real-time online optimization.

In an aspect, when the harmonic component of the grid-side phase current exceeds the predetermined harmonic value, step S106 is further performed for determining the phase angle difference $\Delta\theta$ between the fundamental component of the rectifier AC-side phase current $i_r$ and the fundamental component of the rectifier AC-side phase voltage $u_r$.

The adjustment of the reactive component reference value Iq* is stopped when the phase angle difference $\Delta\theta$ is the predetermined phase angle difference value, and the reactive component reference value Iq* at this moment is applied as the final reactive component reference value. In this embodiment, the predetermined phase angle difference value may be preset to be zero or a preset nonzero value. Moreover, in another embodiment, the predetermined phase angle difference value may further be an optimal value obtained through real-time online optimization.

In another aspect, when the phase angle difference $\Delta\theta$ is not the predetermined phase angle difference value, step S108 is further performed for determining the power factor (PF) of the three-phase switch-mode rectifier module 120. The adjustment of the reactive component reference value Iq* is stopped when the power factor does not reach the predetermined power factor value, and the reactive component reference value Iq* at this moment is applied as the final reactive component reference value.

In still another aspect, when the current power factor exceeds the predetermined power factor value, step S110 is performed for adjusting the reactive component reference value Iq*, thus changing the size of the final reactive component reference value, so as to obtain a smaller dead zone.

Subsequently, the controller 180 compares the reactive component Iq of the grid-side phase current with the final reactive component reference value, and adjusts the three-phase switch-mode rectifier module 120 in a feedback manner according to the comparison result (as shown in FIG. 8), and changes the pulse-width modulation (PWM) setting of the switch elements of the three-phase switch-mode rectifier module 120 until the reactive component Iq of the grid-side phase current approaches the final reactive component reference in value (the reactive component reference value Iq* obtained after the optimal adjustment).

An actual example is used for explaining the process of FIG. 9, and the entire control process of the online regulation may include: detecting the harmonic amount of the electrical grid current. The detection range may be the multi-order harmonic, or the most serious nth-order harmonic, such as a fifth-order harmonic. The Iq* may be adjusted as long as the harmonic does not reach the harmonic control aim. Meanwhile, for eliminating the influences of uncontrolled factors such as the electrical grid voltage harmonic on the electrical grid current harmonic, the adjustment of the reactive component reference value Iq* is stopped when the calculated phase angle difference $\Delta\theta$ is zero (or a value set with consideration of controlling and calculating errors), so as to form the final reactive component reference value. In the entire regulation process, another limiting condition is the power factor (PF). The power factor is calculated in real time during the entire process of adjusting the reactive component reference value Iq* to be optimal and forming the final reactive component reference value. The adjustment of the reactive component reference value Iq* is stopped when the power factor is lower than the lowest threshold, and the final reactive component reference value is maintained without change.

Comparing the aforementioned online regulation manner with the off-line calculation manner of the foregoing paragraphs, the online regulation manner has advantages of demanding no precise device parameters. This online regulation manner is particularly provided for the issues that: when an actual system introduces a LCL filter to replace the inductance for eliminating the switching sub-harmonic, the calculation of the phase relationship is complicated and is easily influenced by factors such as the system parameters, the allowance of the passive device itself and the temperature drift.

However, the aforementioned online regulation manner still may be further improved. The strategic purpose of controlling with the online regulation manner is to control the phase angle difference between the fundamental component of the AC-side phase current flowing through the rectifier and the fundamental component of the rectifier AC-side phase voltage as zero, but from an ideal perspective, to control the dead zone to be minimized is to adjust the direction of the rectifier AC-side phase current and the output level direction of the rectifier AC-side phase voltage to be the same, and a phase difference exists between the actual current, voltage and the fundamental components of the current, voltage, and the control system has certain time delay, which causes that: when the calculated phase angle difference $\Delta\theta$ is zero, the online regulation manner does not necessarily correspond to the minimized dead zone and the lowest low-order harmonic. Thus, the online regulation manner still may be improved.

Figure 10:
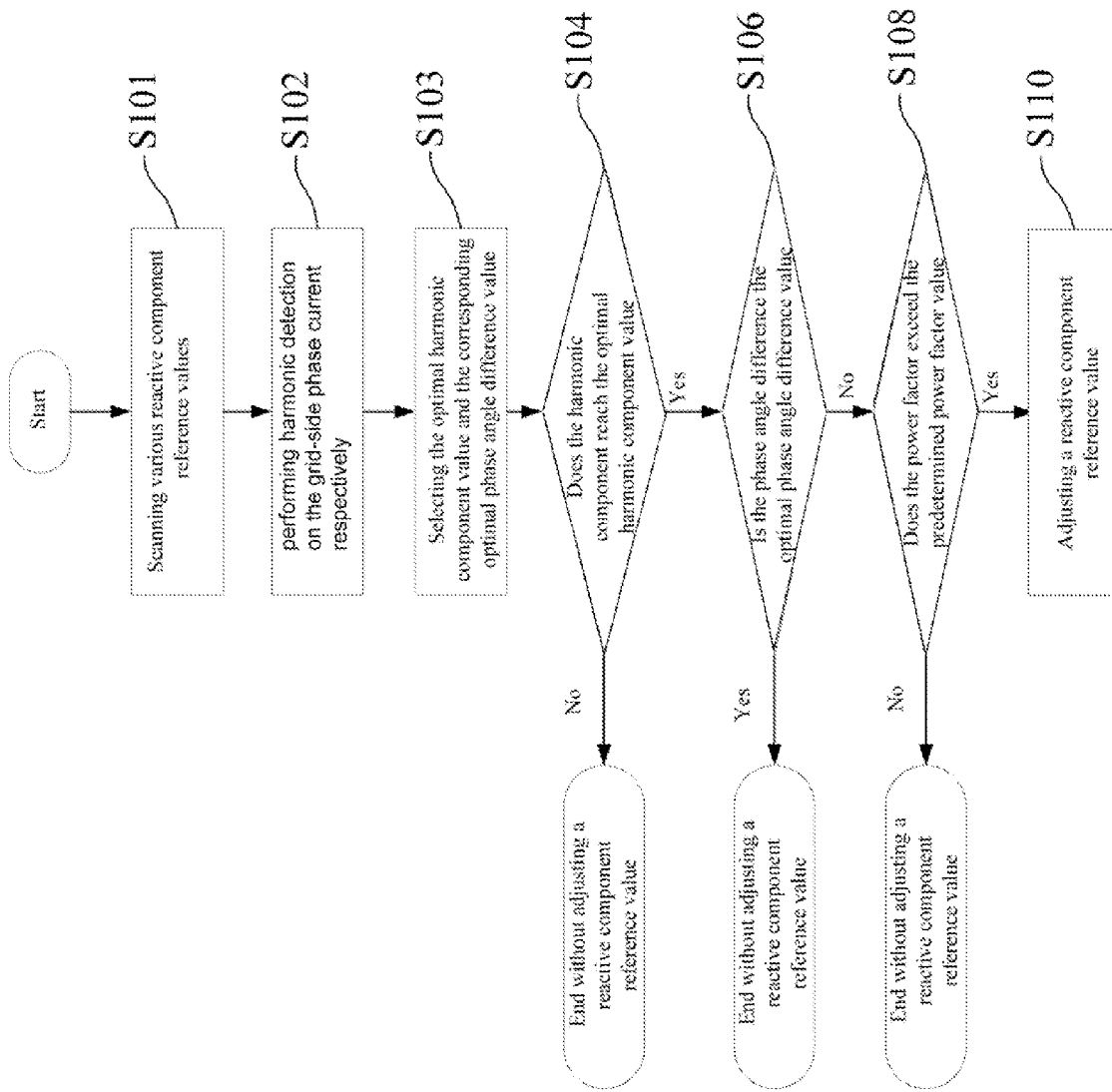
FIG. 10 illustrates a flowchart showing the total harmonic distortion compensation control method of this invention in combination with the online optimizing calculation of the phase angle difference.

Thus, this invention provides a regulation manner of online optimizing. Referring to FIG. 10 at the same time, FIG. 10 illustrates a method flowchart showing the total harmonic distortion compensation control method of this invention in combination with the online optimizing calculation of the phase angle difference Δθ. The detailed description is shown as follows.

Compared with the foregoing method processes, after the start of the rectifier module, step S101 is performed. The total harmonic distortion compensation unit 190 adjusts the three-phase switch-mode rectifier module 120 with different reactive component reference values Iq* within an allowance range of the power factor, i.e. scanning and optimizing the reactive component reference value Iq* within the allowance range of the power factor.

Step S102 is performed for respectively performing harmonic detection under conditions of different reactive component reference values to obtain multiple sets of harmonic components and corresponding multiple phase angle differences. Subsequently, step S103 is performed for selecting an optimal harmonic component value and a corresponding optimal phase angle difference value from the multiple sets of harmonic components and the corresponding multiple phase angle differences. Various reactive component reference values Iq* are scanned within an allowance range of the power factor, so as to obtain the optimal harmonic component value (Harmonic_best) and the corresponding optimal phase angle difference value (Δθ_best). Meanwhile, the optimal reactive component reference value Iq* obtained through online optimization is applied as the final reactive component reference value of this invention.

Subsequently, the optimal harmonic component value is applied as the predetermined harmonic value, and the optimal phase angle difference value is applied as the predetermined phase angle difference value for performing the subsequent steps S104-S110. Thus, the total harmonic distortion compensation unit 190 may determine whether the harmonic component of the grid-side phase current exceeds the optimal harmonic component value, and the total harmonic distortion compensation unit 190 may determine whether the phase angle difference Δθ between the fundamental component of the rectifier AC-side phase current $i_r$ and the fundamental component of the rectifier AC-side phase voltage $u_r$ (in other embodiments, the phase angle difference Δθ may also be a difference of other two components) is the predetermined phase angle difference value.

In this control manner of online optimizing, rather than giving a fixed value, the control step of the phase angle may be combined with an optimal value obtained through actual system optimizing, which may prevent the problem that a precise Δθ cannot be given due to the factors such as linearization of a nonlinear system, thus making the control effect better.

Moreover, the foregoing online optimizing manner of this invention may adopt the phase angle difference Δθ between the fundamental component of the rectifier AC-side phase current $i_r$ and the fundamental component of the rectifier AC-side phase voltage $u_r$, but this invention is not limited thereto and is very flexible in selecting of the phase angle difference Δθ which is not limited to the one between the fundamental component of the rectifier AC-side phase current $i_r$ and the fundamental component of the rectifier AC-side phase voltage $u_r$.

Figure 12:
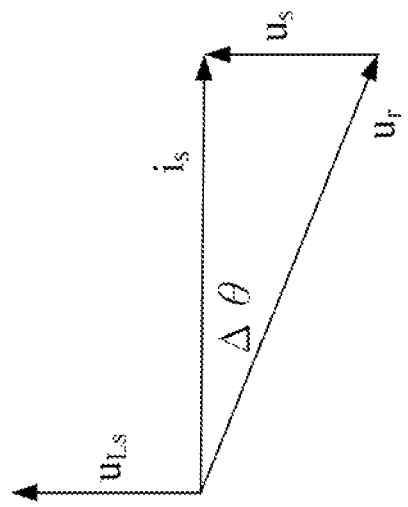
FIG. 12 illustrates the phase relationship of the three-phase switch-mode rectifier module in FIG. 11.
Figure 11:
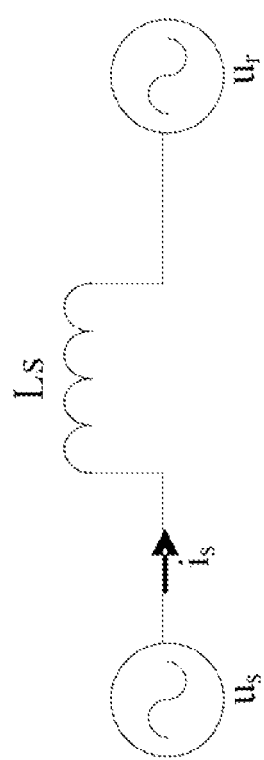
FIG. 11 illustrates a schematic simplified view showing a Vienna rectifier coupled to the three-phase electrical grid.

When the filter is introduced, as shown in FIG. 12, since an exclusive corresponding relationship exists in each of the phase difference between the fundamental component of the rectifier AC-side phase current $i_r$ and the fundamental component of the rectifier AC-side phase voltage $u_r$; the phase difference between the fundamental component of the grid-side phase current and the fundamental component of the rectifier AC-side phase voltage $u_r$; the phase difference between the fundamental component of the grid-side phase current and the fundamental component of the grid-side phase voltage $u_s$; and the phase difference between any two voltages or current components, the control of the phase difference between the rectifier AC-side phase current $i_r$ and the rectifier AC-side phase voltage $u_r$ may be converted into the control of the phase difference between the grid-side phase current and the grid-side phase voltage $u_s$; and the control of the phase difference between any two voltages or current components, without performing detection and calculation on a specific component. Similarly, the step of harmonic detection may be performed on the rectifier AC-side phase current or other voltage/current component to find the optimized value according to actual control demands. Thus, the cost of the sensor may be reduced, and the design of the control procedure may be simplified.

Based on this control strategy, either the hardware errors caused by the system and device parameters or the software errors caused by the digital control may be eliminated. Thus, the harmonic of the electrical grid-side current may be minimized while the power factor is maintained.

Although this invention has been disclosed with reference to the above embodiments, these embodiments are not intended to limit this invention. It will be apparent to those of skills in the art that various modifications and variations can be made without departing from the spirit and scope of this invention. Therefore, the scope of this invention shall be defined by the appended claims.

What is claimed is:

1. A total harmonic distortion compensation control method, used in a three-phase switch-mode rectifier module, wherein the three-phase switch-mode rectifier module is coupled to a three-phase electrical grid for converting an AC voltage input on the three-phase electrical grid into a DC voltage, and the total harmonic distortion compensation control method comprises: performing harmonic detection on a grid-side phase current flowing into the three-phase switch-mode rectifier module; stopping adjusting a reactive component reference value of the grid-side phase current when a harmonic component of the grid-side phase current does not reach a predetermined harmonic value, so as to form a final reactive component reference value, or further determining a phase angle difference between a fundamental component of a rectifier AC-side phase current and a fundamental component of a rectifier AC-side phase voltage of the three-phase switch-mode rectifier module when a harmonic component of the grid-side phase current exceeds the predetermined harmonic value; stopping adjusting the reactive component reference value when the phase angle difference is a predetermined phase angle difference value, or further determining a power factor of the three-phase switch-mode rectifier module when the phase angle difference is not a predetermined phase angle difference value; and stopping adjusting the reactive component reference value when the power factor does not reach a predetermined power factor value, or adjusting the reactive component reference value when the power factor exceeds the predetermined power factor value, so as to change the final reactive component reference value; comparing a reactive component of the grid-side phase current with the final reactive component reference value; and adjusting the three-phase switch-mode rectifier module according to the comparison result above, until the reactive component of the grid-side phase current approaches the final reactive component reference value.

2. The total harmonic distortion compensation control method of claim 1, wherein the predetermined harmonic value is a preset value or an online optimized value.

3. The total harmonic distortion compensation control method of claim 1, wherein the predetermined phase angle difference value is zero, a preset nonzero value or an online optimized value.

4. The total harmonic distortion compensation control method of claim 1, further comprising:
adjusting the three-phase switch-mode rectifier module with different reactive component reference values in an allowance range of a power factor, and respectively performing harmonic detection under conditions of different reactive component reference values to obtain a plurality of harmonic components and a plurality of corresponding phase angle differences; and
selecting an optimal harmonic component value and a corresponding optimal phase angle difference value from the harmonic components and the corresponding phase angle differences.

5. The total harmonic distortion compensation control method of claim 4, wherein the optimal harmonic component value is applied as the predetermined harmonic value, so as to determine whether the harmonic component of the grid-side phase current exceeds the predetermined harmonic value, and the optimal phase angle difference value is applied as the predetermined phase angle difference value, so as to determine whether the phase angle difference between the fundamental component of the rectifier AC-side phase current and the fundamental component of the rectifier AC-side phase voltage is the predetermined phase angle difference value.

6. A total harmonic distortion compensation control method for a mid-voltage variable-frequency driving system comprising a three-phase switch-mode rectifier module, a three-phase electrical grid, a controller and a total harmonic distortion compensation unit, wherein the three-phase switch-mode rectifier module is coupled to the three-phase electrical grid, and the controller is coupled to the three-phase switch-mode rectifier module, and the total harmonic distortion compensation unit is coupled to the controller, and the total harmonic distortion compensation control method comprises: inputting an initial reactive component reference value into the total harmonic distortion compensation unit, wherein the total harmonic distortion compensation unit adjusts the initial reactive component reference value to generate a final reactive component reference value; and controlling each single-phase rectifier circuit of the three-phase switch-mode rectifier module through the controller according to the final reactive component reference value generated by the total harmonic distortion compensation unit, thus adjusting a phase angle difference of the three-phase switch-mode rectifier module, thereby adjusting a power factor corresponding to the three-phase electrical grid and eliminating a current total harmonic distortion corresponding to the three-phase electrical grid, wherein the phase angle difference exists between a fundamental component of a rectifier AC-side phase current and a fundamental component of a rectifier AC-side phase voltage of each single-phase rectifier circuit of the three-phase switch-mode rectifier module; wherein the three-phase switch-mode rectifier module comprises three sets of single-phase rectifier circuits coupled in parallel to each other, which are three-level rectifier circuits each of which receives a single-phase voltage input from the three-phase electrical grid, and the three sets of single-phase rectifier circuits are all coupled to a first output terminal, a midpoint and a second output terminal, and the three-phase switch-mode rectifier module is used for adjusting the power factor and eliminating the current total harmonic distortion.

7. The total harmonic distortion compensation control method of claim 6, wherein an inductance is coupled between each voltage input terminal of the three sets of single-phase rectifier circuits and the three-phase electrical grid, and each of the three sets of single-phase rectifier circuits comprises at least two diodes, wherein one of the two diodes is a commutating diode for ensuring the unidirectivity of the current, and the other one of the two diodes is a non-commutating diode.

8. The total harmonic distortion compensation control method of claim 7, wherein in the three sets of single-phase rectifier circuits, the commutating diode is operated at a switching frequency, and the commutating diode adopts a fast-recovery diode.

9. The total harmonic distortion compensation control method of claim 6, wherein the initial reactive component reference value and the final reactive component reference value are obtained through an off-line calculation when a fundamental component of the rectifier AC-side phase current passing through the three-phase switch-mode rectifier module and a fundamental component of the rectifier AC-side phase voltage have the same direction, and the off-line calculation is performed by calculating the phase relationship between a fundamental component of a grid-side phase current flowing into the three-phase switch-mode rectifier module and a fundamental component of a grid-side phase voltage.

10. The total harmonic distortion compensation control method of claim 9, wherein the initial reactive component reference value and the final reactive component reference value are obtained by obtaining a set of reactive component reference values through the off-line calculation and then selecting the corresponding values through a lookup table according to the operation voltage or operation load current of the three-phase electrical grid in real time.

11. The total harmonic distortion compensation control method of claim 6, wherein the final reactive component reference value generated by the total harmonic distortion compensation unit further controls a switching state of the switch elements in each single-phase rectifier circuit of the three-phase switch-mode rectifier module through the controller, thereby adjusting the power factor corresponding to the three-phase electrical grid and eliminating the current total harmonic distortion corresponding to the three-phase electrical grid.

12. The total harmonic distortion compensation control method of claim 6, wherein the step of the total harmonic distortion compensation unit adjusting the initial reactive component reference value to generate the final reactive component reference value further comprises:
performing harmonic detection on a grid-side phase current flowing into the three-phase switch-mode rectifier module; and
stopping adjusting a reactive component reference value of the grid-side phase current when a harmonic component of the grid-side phase current does not reach a predetermined harmonic value, so as to form the final reactive component reference value.

13. The total harmonic distortion compensation control method of claim 12, wherein the step of the total harmonic distortion compensation unit adjusting the initial reactive component reference value to generate the final reactive component reference value further comprises:
further determining the phase angle difference between the fundamental component of the rectifier AC-side phase current and the fundamental component of the rectifier AC-side phase voltage of each single-phase rectifier circuit of the three-phase switch-mode rectifier module when a harmonic component of the grid-side phase current exceeds the predetermined harmonic value; and stopping adjusting the reactive component reference value when the phase angle difference is a predetermined phase angle difference value, so as to form the final reactive component reference value.

14. The total harmonic distortion compensation control method of claim 13, further comprising:
further determining a power factor of the three-phase switch-mode rectifier module when the phase angle difference is not the predetermined phase angle difference value, and stopping adjusting the reactive component reference value when the power factor of the three-phase switch-mode rectifier module is lower than the predetermined power factor, so as to form the final reactive component reference value.

15. The total harmonic distortion compensation control method of claim 14, wherein the reactive component reference value is adjusted when the power factor is higher than the predetermined power factor value, so as to change the final reactive component reference value.

16. The total harmonic distortion compensation control method of claim 15, further comprising:
comparing a reactive component of the grid-side phase current with the adjusted final reactive component reference value, thereby obtaining a comparison result; and
adjusting the three-phase switch-mode rectifier module according to the comparison result, until the reactive component of the grid-side phase current approaches the final reactive component reference value.

17. The total harmonic distortion compensation control method of claim 12, wherein the predetermined harmonic value is a preset value or an online optimized value.

18. The total harmonic distortion compensation control method of claim 13, wherein the predetermined phase angle difference value is zero, a preset nonzero value or an online optimized value.

19. The total harmonic distortion compensation control method of claim 14, comprising: adjusting the three-phase switch-mode rectifier module with different reactive component reference values in an allowance range of a power factor, and respectively performing harmonic detection under conditions of different reactive component reference values to obtain a plurality of harmonic components and a plurality of corresponding phase angle differences; and selecting an optimal harmonic component value and a corresponding optimal phase angle difference value from the harmonic components and the corresponding phase angle differences.

20. The total harmonic distortion compensation control method of claim 19, wherein the optimal harmonic component value is applied as the predetermined harmonic value for determining whether the harmonic component of the grid-side phase current exceeds the predetermined harmonic value, and the optimal phase angle difference value is applied as the predetermined phase angle difference value for determining whether the phase angle difference between the fundamental component of the rectifier AC-side phase current and the fundamental component of the rectifier AC-side phase voltage is the predetermined phase angle difference value.

21. A mid-voltage variable-frequency driving system coupled to a three-phase electrical grid for driving an induction motor, the mid-voltage variable-frequency driving system comprising: a three-phase switch-mode rectifier module coupled to the three-phase electrical grid for converting an AC voltage input on the three-phase electrical grid into a DC voltage; a controller coupled to the three-phase switch-mode rectifier module, wherein the controller compares a sampled reactive component of a grid-side phase current from the three-phase electrical grid with a final reactive component reference value, thereby obtaining a first comparison result, and thus controls the three-phase switch-mode rectifier module according to the first comparison result until the reactive component approaches the final reactive component reference value; and a total harmonic distortion compensation unit, wherein the total harmonic distortion compensation unit is used for performing an optimal adjustment on the reactive component reference value such that a harmonic component of the grid-side phase current is reduced while the power factor is maintained; wherein the total harmonic distortion compensation unit performs harmonic detection on a grid-side phase current flowing into the three-phase switch-mode rectifier module, and stops adjusting a reactive component reference value of the grid-side phase current when a harmonic component of the grid-side phase current does not reach the predetermined harmonic value so as to form the final reactive component reference value; or the total harmonic distortion compensation unit further determines a phase angle difference between a fundamental component of a rectifier AC-side phase current and a fundamental component of a rectifier AC-side phase voltage of each single-phase rectifier circuit of the three-phase switch-mode rectifier module when a harmonic component of the grid-side phase current exceeds the predetermined harmonic value, wherein the total harmonic distortion compensation unit stops adjusting the reactive component reference value when the phase angle difference is the predetermined phase angle difference value so as to form the final reactive component reference value; or the total harmonic distortion compensation unit further determines a power factor of the three-phase switch-mode rectifier module when the phase angle difference is not the predetermined phase angle difference value, wherein the total harmonic distortion compensation unit stops adjusting the reactive component reference value when the power factor does not reach a predetermined power factor value so as to form the final reactive component reference value, or adjusts the reactive component reference value in when the power factor exceeds the predetermined power factor value so as to change the final reactive component reference value.

22. The mid-voltage variable-frequency driving system of claim 21, wherein the controller compares a reactive component of the grid-side phase current with the final reactive component reference value, thereby obtaining a second comparison result, and adjusts the three-phase switch-mode rectifier module according to the second comparison result above until the reactive component of the grid-side phase current approaches the final reactive component reference value.

23. The mid-voltage variable-frequency driving system of claim 21, wherein a filter unit is coupled to each single-phase input path between the three-phase switch-mode rectifier module and the three-phase electrical grid, and the filter unit comprises a first reactance, a second reactance and a capacitor coupled in series.

24. The mid-voltage variable-frequency driving system of claim 23, wherein the total harmonic distortion compensation unit adjusts the three-phase switch-mode rectifier module with different reactive component reference values in an allowance range of a power factor, and performs harmonic detection respectively under conditions of different reactive component reference values to obtain a plurality of harmonic components and a plurality of corresponding phase angle differences, and selects an optimal harmonic component value and a corresponding optimal phase angle difference value generated through an online optimization.

25. The mid-voltage variable-frequency driving system of claim 24, wherein the optimal harmonic component value generated through the online optimization is applied as the predetermined harmonic value, and thereby the total harmonic distortion compensation unit determines whether the harmonic component of the grid-side phase current exceeds the predetermined harmonic value; and the optimal phase angle difference value is applied as the predetermined phase angle difference value, and thereby the total harmonic distortion compensation unit determines whether the phase angle difference between the fundamental component of the rectifier AC-side phase current and the fundamental component of the rectifier AC-side phase voltage is the predetermined phase angle difference value.

26. The mid-voltage variable-frequency driving system of claim 21, wherein the three-phase switch-mode rectifier module comprises three sets of single-phase rectifier circuits coupled in parallel to each other, which are three-level rectifier circuits each of which receives a single-phase voltage input from the three-phase electrical grid, and the three sets of single-phase rectifier circuits are all coupled to a first output end, a midpoint and a second output end, and the three-phase switch-mode rectifier module is used for adjusting the power factor and eliminating the current total harmonic distortion.

27. The mid-voltage variable-frequency driving system of claim 26, wherein an inductance is coupled between each voltage input end of the three sets of single-phase rectifier circuits and the three-phase electrical grid, and each of the three sets of single-phase rectifier circuits comprises at least two diodes, wherein one of the two diodes is a commutating diode for ensuring the unidirectivity of the current, and the other one of the two diodes is a non-commutating diode.

28. The mid-voltage variable-frequency driving system of claim 27, wherein in the three sets of single-phase rectifier circuits, the commutating diode is operated at a switching frequency, and the commutating diode adopts a fast-recovery diode.

29. The mid-voltage variable-frequency driving system of claim 21, wherein the three-phase switch-mode rectifier module is a three-phase Vienna rectifier module.

30. The mid-voltage variable-frequency driving system of claim 21, further comprising: an inverter coupled to the three-phase switch-mode rectifier module, wherein the inverter is combined with the three-phase switch-mode rectifier module and converts the DC voltage into an AC voltage used for driving the induction motor; and a high-capacity capacitor module coupled between the three-phase switch-mode rectifier module and the inverter for temporarily storing the DC voltage.

31. The mid-voltage variable-frequency driving system of claim 30, wherein the three-phase switch-mode rectifier module comprises:
three sets of single-phase rectifier circuits coupled to each other, each of the three sets of single-phase rectifier circuits respectively receiving single-phase voltage input from the three-phase electrical grid, wherein the three sets of single-phase rectifier circuits are all coupled to a first output terminal, a midpoint and a second output terminal.

32. The mid-voltage variable-frequency driving system of claim 31, wherein the high-capacity capacitor module comprises:

a first capacitor coupled between the first output terminal and the midpoint; and
a second capacitor coupled between the midpoint and the second output terminal.

33. The mid-voltage variable-frequency driving system of claim 32, wherein each of the three sets of single-phase rectifier circuits comprises:
a first diode, wherein an anode of the first diode is coupled to the single-phase voltage input;
a second diode, wherein an anode of the second diode is coupled to a cathode of the first diode, and a cathode of the second diode is coupled to the first output terminal;
a third diode, wherein a cathode of the third diode is coupled to the single-phase voltage input;
a fourth diode, wherein a cathode of the fourth diode is coupled to an anode of the third diode, and an anode of the fourth diode is coupled to the second output terminal;
a first switch, wherein a first terminal of the first switch is coupled between the first diode and the second diode, and a second terminal of the first switch is coupled to the midpoint, and
a second switch, wherein a first terminal of the second switch is coupled to the midpoint, and a second terminal of the second switch is coupled between the third diode and the fourth diode.

34. A total harmonic distortion compensation control method for a mid-voltage variable-frequency driving system comprising a three-phase switch-mode rectifier module, a three-phase electrical grid, a controller and a total harmonic distortion compensation unit, wherein the three-phase switch-mode rectifier module is coupled to the three-phase electrical grid, and the controller is coupled to the three-phase switch-mode rectifier module, and the total harmonic distortion compensation unit is coupled to the controller, and the total harmonic distortion compensation control method comprises: inputting a initial reactive component reference value into the total harmonic distortion compensation unit, wherein the total harmonic distortion compensation unit adjusts the initial reactive component reference value to generate a reactive component reference value; and controlling each single-phase rectifier circuit of the three-phase switch-mode rectifier module through the controller according to the final reactive component reference value generated by the total harmonic distortion compensation unit, thus adjusting a phase angle difference of the three-phase switch-mode rectifier module, thereby adjusting a power factor corresponding to the three-phase electrical grid and eliminating a current total harmonic distortion corresponding to the three-phase electrical grid; wherein the phase angle difference exists between a fundamental component of a rectifier AC-side phase current and a fundamental component of a rectifier AC-side phase voltage, between a fundamental component of a grid-side phase current and a fundamental component of a rectifier AC-side phase voltage, or between a fundamental component of a grid-side phase current and a fundamental component of a grid-side phase voltage.

\* \* \* \* \*